United States Patent [19]

Ramirez et al.

[11] 4,219,416

[45] Aug. 26, 1980

[54] PROCESS FOR RECOVERING MOLYBDENUM AND TUNGSTEN FROM MINING WASTEWATER

[75] Inventors: Ernest R. Ramirez, Lemont, Ill.; Gopalan Ramadorai, Fullerton, Calif.

[73] Assignee: Dravo Corporation, Pittsburgh, Pa.

[21] Appl. No.: 920,259

[22] Filed: Jun. 29, 1978

[51] Int. Cl.$^2$ .......................... C02B 1/20; C02C 5/12
[52] U.S. Cl. ..................................... 210/44; 75/109; 210/51; 210/53; 210/DIG. 30; 423/58; 423/87
[58] Field of Search ................. 75/108, 109; 204/149; 210/42 R, 44, 49, 51-54, DIG. 30; 423/55, 58, 87

[56] References Cited

U.S. PATENT DOCUMENTS

| | | | |
|---|---|---|---|
| 873,809 | 12/1907 | Van Brunt | 75/108 |
| 2,982,608 | 5/1961 | Clement | 210/53 |
| 3,203,968 | 8/1965 | Sebba | 209/167 |
| 3,238,127 | 3/1966 | Sebba | 210/44 |
| 3,418,237 | 12/1968 | Booth et al. | 210/54 |
| 3,476,553 | 11/1969 | Sebba et al. | 75/108 |
| 3,553,126 | 1/1971 | Oberhofer | 210/37 |
| 3,575,853 | 4/1971 | Gaughan et al. | 210/DIG. 30 |
| 3,860,513 | 1/1975 | Hart et al. | 210/42 R |
| 3,959,131 | 5/1976 | Ramirez et al. | 210/44 |
| 3,969,245 | 7/1976 | Ramirez | 210/44 |
| 3,975,269 | 8/1976 | Ramirez | 210/44 |
| 4,005,009 | 1/1977 | Kinoshita | 210/44 |
| 4,014,787 | 3/1977 | Shorr | 210/23 F |

FOREIGN PATENT DOCUMENTS

| | | | |
|---|---|---|---|
| 2714262 | 3/1978 | Fed. Rep. of Germany | 423/87 |
| 144988 | 4/1962 | U.S.S.R. | 75/109 |
| 456789 | 3/1973 | U.S.S.R. | 423/55 |
| 454178 | 5/1973 | U.S.S.R. | 423/55 |

Primary Examiner—Charles N. Hart
Assistant Examiner—Peter A. Hruskoci
Attorney, Agent, or Firm—Parmelee, Miller, Welsh & Kratz

[57] ABSTRACT

A process for removal of heavy metals in their anionic state, particularly tungsten and molybdenum, from industrial mining wastewater by chemical precipitation of the heavy metal values, followed by gas flotation.

10 Claims, No Drawings

PROCESS FOR RECOVERING MOLYBDENUM AND TUNGSTEN FROM MINING WASTEWATER

This invention relates to the recovery of heavy metal values from mining wastewater, and more particularly, to the recovery of heavy metals such as tungsten and molybdenum which are present in their anionic state, by forming insoluble precipitates of these values and thereafter removing same by gas flotation.

Formerly, heavy metal values were removed from mining wastewater only if they were present in sufficient amounts that their recovery would enable sale for profit. However, more recently, in view of Environmental Protection Agency standards directed to the composition of industrial discharge waters, it has become necessary to treat various industrial wastewaters to obtain a discharge water composition having low levels of heavy metals. Accordingly, it has become necessary to devise an efficient, inexpensive method of treating mining wastewaters to minimize their content of heavy metals.

One such process which has been used in the past consists of an ion exchange process wherein heavy metal values, such as molybdenum and tungsten, are replaced with other anions in an ion exchange bed. A second prior art process entails treating mining wastewaters by reverse osmosis wherein wastewater is subjected to high pressures (about 100 psi) and the wastewater is selectively passed through a semi-permeable membrane to separate the heavy metal values from the remaining wastewater. Both the ion exchange process and the reverse osmosis process require very expensive capital installations and high operating costs. Accordingly, such processes are not feasible when applied to removing relatively small quantities of heavy metal values from wastewater, e.g. 20 ppm.

Another general concept for removal of heavy metal values from wastewater comprises forming heavy metal precipitates, and thereafter removing such precipitates from the wastewater. Removal is generally effected by allowing the precipitates to settle out. This means of separation is very inefficient. The present invention, on the other hand, involves a unique and surprising process for efficiently and inexpensively removing heavy metal values.

It is an important object of the present invention to provide an improved process for treating wastewaters to remove heavy metal values.

It is an additional object of the present invention to provide an improved process for treating mining wastewaters to remove molybdenum and tungsten values.

It is also an object of the present invention to provide an improved process for forming insoluble complexes of molybdenum and tungsten within the wastewaters, and thereafter removing such complexes by gas flotation.

It is a further object of the present invention to form insoluble tungsten and molybdenum complexes in mining wastewater, and thereafter removing such complexes by flotation with electrolytically generated microbubbles.

Generally, the objects of the present invention are carried out by a selective precipitation of anionic metal complexes within a narrow pH range of between about 2.0 and 6.0, followed by gas flotation. The process is amenable to any aqueous medium containing heavy metal values in their anionic form, but is primarily directed to the treatment of mining wastewater, such as mine water tailings, that contain trace amounts of heavy metals. Heavy metals that may be removed include tungsten (as tungstates), molybdenum (as molybdates), chromium (as chromates) and arsenic (as arsenates).

Initially, the pH of the mining wastewater is adjusted to a value of between 2.0 to 6.0, and preferably between 3.0 and 5.0. This is accomplished by the addition of a mineral acid to the wastewater in sufficient amounts to provide the desired pH. Although any mineral acid may be utilized to adjust pH, it is preferred to use sulfuric acid in view of its availability and low cost.

Also, a trivalent metal cation is added to the wastewater, either before or after pH adjustment. The trivalent metal ion may be ferric, cobalt, aluminum, chromium or rhenium. Preferably, however, ferric sulfate is used to provide trivalent ferric ions in view of its availability, low cost, and ease of use. The trivalent metal cation is added to the wastewater in amounts so as to provide from about 6 to 20 parts per million (ppm) of the trivalent metal cation to each ppm of the heavy metal ion, and preferably, from 8 to 12 ppm of the trivalent metal cation to each ppm of the heavy metal ion. One part per million (1 ppm) is equivalent to one milligram per liter. The treated wastewater is then preferably retained for at least 3 minutes prior to any further processing, so as to enable the formation of insoluble ferric molybdate, tungstate, chromate and arsenate salts.

After retention, a basic chemical is added to the wastewater in order to provide hydroxyl ions to form insoluble ferric hydroxide with the excess ferric ions. Any source of hydroxyl ions is suitable, but preferably, calcium hydroxide (lime) is used. The base should be added in an amount to raise the pH slightly, but not in excess of pH 6. Preferably, the base will be added in an amount to increase pH about 0.5 units above the pH obtained subsequent to acid addition. The hydroxyl ions will form, at acidic pH, a gelatinous precipitate with aluminum as well as ferric ions. Apparently, the gelatinous ferric hydroxide co-precipitates with the insoluble heavy metal salts.

After treatment of the mining wastewater in accordance with the above-described procedures, the wastewater stream is subjected to a dense flow of gas bubbles to create embryo flocs of heteropoly molybdate and tungstate salts as well as metal hydroxides. The dense zone of bubbles may be supplied by a source of dispersed gas or dissolved gas (such as pressurized air). Preferably, however, the dense zone of very fine microbubbles is generated electrolytically, ususally by decomposition of the wastewater. Generally, the wastewater flow is horizontal while the gas bubbles initially contact the wastewater flow in a substantially vertical orientation. It has been found that the microbubbles for flotation are most effective when exhibiting diameters of 10–500 microns, preferably 20–300 microns, and most preferably 30–150 microns. Moreover, the bubbles should be generated in sufficient quantity to provide from $10^4$–$10^9$ bubbles per liter of wastewater treated, and preferably from about $10^6$–$10^8$ bubbles per liter of wastewater treated. Also, the microbubbles should comprise from 0.1 to 10.0 volume % of the wastewater being treated.

As previously mentioned, the dense zone of bubbles is preferably generated electrolytically. This may be carried out by passing the wastewater stream through an electrocoagulation cell which contains an electrode grid positioned horizontally just above the bottom of the cell. This electrode grid will consist of appropriately spaced pairs of anodes and cathodes to provide a suitable current density across the bottom of the cell to generate the desired volume of microbubbles. Depending on the density and volume of microbubbles to be generated, the electrode grid is generally designed to provide an energy input of between about 0.5 to 20 ampere-minutes per gallon of wastewater treated, and preferably from about 5 to 10 ampere-minutes per gallon. Design of the electrode grid arrangement should be in accordance with U.S. Pat. No. 3,959,131 of Ramirez et al., the description of which is incorporated herein by reference.

Treatment of the wastewater stream with a dense zone of gas microbubbles causes insoluble molybdate and tungstate complexes to aggomerate together in embryo flocs, buoyed upwardly by the rising microbubbles. These embryo flocs could be allowed to collect at the surface, and could then be removed as by skimming. However, it is greatly preferred to add a polyelectrolyte polymer flocculent to the embryo floc-containing wastewater at this point, and then flowing the wastewater into a basin where it is subjected to a second flotation with gas microbubbles. The flocculant can be any high molecular weight polyelectrolyte polymer normally used to floc particulates, but preferably it will be an anionic polyacrylic acrylamide, usually in amounts of from about 0.5 to 6 ppm (mg/l.).

Microbubbles in the basin can be generated by means of dispersed gas, dissolved gas, or preferably, may be generated electrolytically. When electrolytic microbubble generation is contemplated, the wastewater may be flowed into a large, open rectangular basin having an electrode grid horizontally positioned across the bottom. Preferably, this electrode grid will extend over only a portion of the length of the basin, and will be designed to provide a decreasing density of microbubbles along the length of the basin from influent end towards effluent end. To effect gradient current density zones, and thus gradient bubble density zones, grids may be designed in accordance with the disclosures in U.S. Pat. Nos. 3,959,131 of Ramirez et al. and 4,012,319 of Ramirez, the descriptions of which are hereby incorporated by reference.

The microbubbles generated in the flotation basin act to promote further floccing of the embryo flocs, resulting in full-grow flocs that are buoyed to the surface of the basin. These full flocs may then be skimmed from the surface, as with countercurrent directed skimmer blades positioned above the basin, and treated to remove molybdenum and tungsten values. Generally, the present invention is operable to reduce total Mo and W values down to levels of less than 1 ppm, and often as low as 0.3 ppm. Also, total iron content is reduced due to the formation of insoluble ferric hydroxide. Moreover, the present invention is operable to treat relatively large volumes of wastewater in the range of up to several thousand gallons per minute.

Another advantage of the present invention is that it may be carried out utilizing relatively low capital equipment costs. In addition, chemicals normally used to form the insoluble heteropoly heavy metal precipitates are sulfuric acid and ferric sulfate, both of which are inexpensive and readily available. Finally, in addition to providing a wastewater suitable for discharge in accordance with EPA regulations, heavy metals, such as tungsten and molybdenum, in the skimmings are readily recoverable for their market value.

While we are not positive as to how the insoluble heteropoly heavy metal complexes are formed in accordance with the present invention, it is believed that with respect to molybdenum, the following reactions take place. It is hypothesized that in an acidic solution with a pH of between 2.0 and 6, the addition of ferric sulfate salt to the wastewater stream results in the formation of the ferric salt $(Fe_2 Mo_6 O_{24})$-6. It is further believed that this ferric salt, when in the presence of excess ferric ion, is subsequently converted to the ferric heteropoly molybdate salt $Fe_2(Fe_2 Mo_6 O_{24})$. We also believe that pH control is especially critical in carrying out the present invention because at pH values in excess of about 5 or 6, ferric hydroxide becomes less soluble than the ferric heteropoly molybdate, and therefore, the ferric ion is depleted by forming ferric hydroxides, and so becomes unavailable to form the insoluble heteropoly molybdate salt.

The following examples are intended to set forth illustrative embodiments of the process and are not to be taken in any manner as limiting the scope of the invention as defined by the appended claims.

EXAMPLE I

A molybdenum processing wastewater exhibited the following metal components: 1.6 ppm molybdenum, 2.0 ppm iron. The pH of the wastewater was 6.8. The wastewater was treated with 400 ppm of sulfuric acid to adjust pH to a value of 2.0. Thereafter, ferric sulfate in an amount sufficient to provide 19 ppm of ferric ion per ppm molybdenum ion was added to the wastewater. Subsequently, 100 ppm calcium hydroxide was added. The wastewater was then treated with four (4) ampere minutes of electrical energy per gallon within an electrolytic cell so as to form embryo flocs of ferric heteropoly molybdate salts and ferric hydroxide. Thereafter, 2 ppm of anionic polymer flocculant was added to the wastewater, which was then subjected to an additional four (4) ampere minutes of electrical energy per gallon such that the entire floc of ferric molybdate salt and ferric hydroxide was floated to the surface by gas buoying. Analysis of the resulting treated water showed molybdenum values at 0.33 ppm and total iron values of 0.5 ppm.

EXAMPLE II

A molybdenum processing wastewater was doped to contain 18 ppm Mo and 1.5 ppm iron. 216 ppm of ferric ion was added as ferric sulfate, and pH was adjusted to 2.0 by addition of 100 ppm sulfuric acid. 200 ppm lime was then added to raise pH to 4.5. The solution was then treated in an electrocoagulation cell with 5 ampere-minutes current per gallon. 4 ppm of an anionic polymer flocculant was added and thoroughly mixed. The solution was then treated with an additional 3 ampere-minutes of electrical energy per gallon, causing flotation of the ferric molybdate salt and ferric hydroxide. Analysis of the treated solution showed the presence of Mo at 0.35 ppm and total iron at 0.6 ppm.

EXAMPLE III

Mine tailing effluent containing 1.86 ppm molybdenum was treated by this process. Ratio of ferric sulfate added was either 6 ppm ferric to 1 ppm molybdenum or 12 ppm ferric to 1 ppm molybdenum. Initial pH adjustment was made by addition of from 120–760 ppm sulfuric acid, giving a solution pH of from 2.0 to 3.09. A second pH adjustment was made by addition of from 0 to 120 ppm lime, giving a final pH of from 2.0 to 10.8. The precipitates formed were coagulated with electrolytically generated microbubbles, after which 3 ppm of anionic polymer was added. Additional electrolytically generated microbubbles were utilized in effecting flotation of the coagulated precipitate. Flotation skimmings were removed, and the remaining solutions were analyzed for molybdenum. Results were as follows:

| Initial Conc. of Mo | Ratio Fe/Mo (ppm) | ppm $H_2SO_4$/pH | ppm Lime/pH | Final Conc. of Mo | % Removal |
|---|---|---|---|---|---|
| 1.86 ppm | 6:1 | 760 (2.0) | 0 (2.0) | 1.9 Mo ppm | 0 |
| " | 6:1 | 160 (3.0) | 0 (3.0) | 1.9 Mo | 0 |
| " | 6:1 | 160 (3.0) | 25 (3.65) | 0.84 Mo | 54.8 |
| " | 6:1 | 140 (3.0) | 40 (4.34) | 1.0 Mo | 46.2 |
| " | 6:1 | 140 (3.0) | 80 (6.30) | 1.6 Mo | 14.0 |
| " | 6:1 | 140 (3.0) | 120 (9.85) | 1.7 Mo | 8.6 |
| " | 12:1 | 100 (3.16) | 0 (3.16) | 1.3 Mo | 30.1 |
| " | 12:1 | 110 (3.03) | 25 (3.58) | 0.58 Mo | 68.8 |
| " | 12:1 | 120 (3.02) | 60 (4.00) | 0.24 Mo | 87.1 |
| " | 12:1 | 120 (3.05) | 80 (5.80) | 0.54 Mo | 71.0 |
| " | 12:1 | 120 (3.03) | 90 (6.26) | 0.72 Mo | 61.3 |
| " | 12:1 | 120 (3.09) | 120 (10.8) | 1.56 Mo | 16.1 |

EXAMPLE IV

Synthetic "doped" solutions were prepared containing either 20 ppm molybdenum, 20 ppm chromium or 20 ppm tungsten. The ratio of ferric ion to Mo, Cr or W was either 6:1 or 12:1. Initial pH was adjusted by addition of sulfuric acid, with pH being subsequently adjusted by addition of lime. As in Example III, the solutions were treated with electrolytically generated microbubbles, anionic polymer added, and again treated with microbubbles. Flotation skimmings were removed and final solutions analyzed for Mo, Cr or W. The results were as follows:

| Initial Conc. of Mo, Cr or W | Ratio of Fe to Mo, Cr or W | ppm $H_2SO_4$ and pH | ppm Lime and pH | Final Conc. (ppm) | % Removal |
|---|---|---|---|---|---|
| 20 Mo ppm | 6:1 | 200 (3.08) | 40 (3.58) | 1.27 Mo | 93.6 |
| " | 6:1 | 200 (3.02) | 80 (4.20) | 1.32 Mo | 93.4 |
| " | 6:1 | 200 (2.99) | 100 (5.35) | 1.46 Mo | 92.7 |
| " | 6:1 | 200 (3.09) | 250 (8.25) | 12.0 Mo | 40.0 |
| " | 12:1 | 60 (2.97) | 60 (3.50) | 0.57 Mo | 97.2 |
| " | 12:1 | 60 (3.00) | 100 (4.42) | 0.58 Mo | 97.1 |
| " | 12:1 | 60 (3.30) | 250 (8.41) | 9.4 Mo | 53.0 |
| " | 12:1 | 40 (4.20) | 280 (9.00) | 10.7 Mo | 46.5 |
| 20 Cr ppm | 12:1 | 60 (3.02) | 100 (4.55) | 10.0 Cr | 50.0 |
| 20 W ppm | 12:1 | 100 (2.70) | 100 (4.30) | 5.0 W | 75 |

Obviously, many modifications and variations of the invention as hereinbefore set forth may be made without departing from the spirit and scope thereof, and only such limitations should be imposed as are indicated in the appended claims.

We claim:

1. A method for removing heavy metals selected from the group consisting essentially of molybdenum, tungsten, chromium and arsenic from wastewater in their anionic forms as molybdates, tungstates, chromates and arsenates comprising the steps of adding to a wastewater having a pH of between about 2.0 to 6.0, a trivalent metal ion selected from the group consisting of ferric, cobalt, aluminum, chromium or rhenium to the wastewater in an amount sufficient to provide from 6 to 20 ppm trivalent metal cations per ppm of total molybdate, tungstate, chromate and arsenate ions to form insoluble heteropoly molybdate, tungstate, chromate and arsenate salts within the wastewater; adding a hydroxyl providing base to raise the pH yet maintain it within the acidic range to form a gelatinous precipitate; subjecting the wastewater to a dense zone of microbubbles to form embryo flocs from the insoluble salts; adding an anionic polyelectrolyte polymer flocculant to the wastewater; and thereafter subjecting the wastewater to an additional dense zone of microbubbles to form from the embryo flocs full flocs that are buoyed to the surface.

2. The method of claim 1 wherein the microbubbles are electrolytically generated in an amount of from $10^4$–$10^9$ microbubles per liter of wastewater and comprise from 0.1 to 10 volume % of the wastewater being treated.

3. The method of claim 2 wherein the microbubbles exhibit a diameter of from 20–300 microns and wherein the bubbles are provided in amounts of from $10^6$–$10^8$ per liter of wastewater.

4. The method of claim 2 wherein the pH of the wastewater is initially adjusted to from about 3.0 to 5.0 and wherein from about 8 to 12 ppm of trivalent metal ion per heavy metal ion is added.

5. The method of claim 2 wherein the trivalent metal ion is ferric ion supplied by ferric sulfate.

6. The method of claim 2 wherein the flocculant is an anionic polyacrylic acrylamide and is added in the amount of 0.5 to 6 ppm.

7. The method of claim 2 wherein the second dense zone of microbubbles to which the wastewater is subjected exhibits a decreasing density of microbubbles from the influent end toward the effluent end of the zone.

8. The method of claim 2 wherein the wastewater is mining wastewater.

9. The method of claim 2 wherein the hydroxyl providing base is calcium hydroxide.

10. The method of claim 2 wherein the initial pH is adjusted by addition of sulfuric acid.

* * * * *